US012800037B2

(12) United States Patent
Vincon et al.

(10) Patent No.: US 12,800,037 B2
(45) Date of Patent: Nov. 17, 2026

(54) DISC VALVE DEVICE, DISC VALVE AND METHOD FOR PRODUCING A DISC VALVE DEVICE

(71) Applicant: ETO MAGNETIC GMBH, Stockach (DE)

(72) Inventors: Peter Vincon, Stockach (DE); Yannick Goos, Allensbach (DE); Michael Feindler, Stockach (DE)

(73) Assignee: ETO MAGNETIC GmbH, Stockach (DE)

(*) Notice: Subject to any disclaimer, the term of this patent is extended or adjusted under 35 U.S.C. 154(b) by 56 days.

(21) Appl. No.: 18/728,596

(22) PCT Filed: Dec. 21, 2022

(86) PCT No.: PCT/EP2022/087322
§ 371 (c)(1),
(2) Date: Oct. 14, 2024

(87) PCT Pub. No.: WO2023/134992
PCT Pub. Date: Jul. 20, 2023

(65) Prior Publication Data

US 2025/0155032 A1 May 15, 2025

(30) Foreign Application Priority Data

Jan. 14, 2022 (DE) ..................... 10 2022 100 831.2

(51) Int. Cl.
*F16K 11/074* (2006.01)
*F16K 25/00* (2006.01)

(52) U.S. Cl.
CPC ............ *F16K 11/074* (2013.01); *F16K 25/00* (2013.01)

(58) Field of Classification Search
CPC . F16K 3/08; F16K 3/10; F16K 11/074; F16K 25/00; F16K 27/045; F16K 27/105
See application file for complete search history.

(56) References Cited

U.S. PATENT DOCUMENTS 4,440,382 A * 4/1984 Pruvot ...................... F16K 3/10 251/192
4,588,504 A * 5/1986 Berges .................. F16L 37/367 210/234

(Continued)

FOREIGN PATENT DOCUMENTS

CN 104141801 A 11/2014
DE 3539316 A1 5/1987

(Continued)

OTHER PUBLICATIONS

Search Report received in related German Application No. 10 2022 100 831.2, mailed Oct. 24, 2022, 14 pages.

(Continued)

*Primary Examiner* — Eric Keasel
(74) *Attorney, Agent, or Firm* — Womble Bond Dickinson (US) LLP

(57) ABSTRACT

A disc valve device has at least one first valve part comprising at least one first fluid port, further has at least one second valve part comprising at least one second fluid port which is manufactured separately from the first valve part, and has at least one disc pack comprising at least one first valve disc and at least one second valve disc that is rotatable relative to the first valve disc, wherein flow-through paths can be opened and/or closed depending on a position of the valve discs of the disc pack relative to one another, and wherein the first valve part and the second valve part are mounted to each other in such a way that the valve parts together form a disc pack receiving space within which at least the disc pack is accommodated, wherein the disc valve (Continued)

Figure 1:
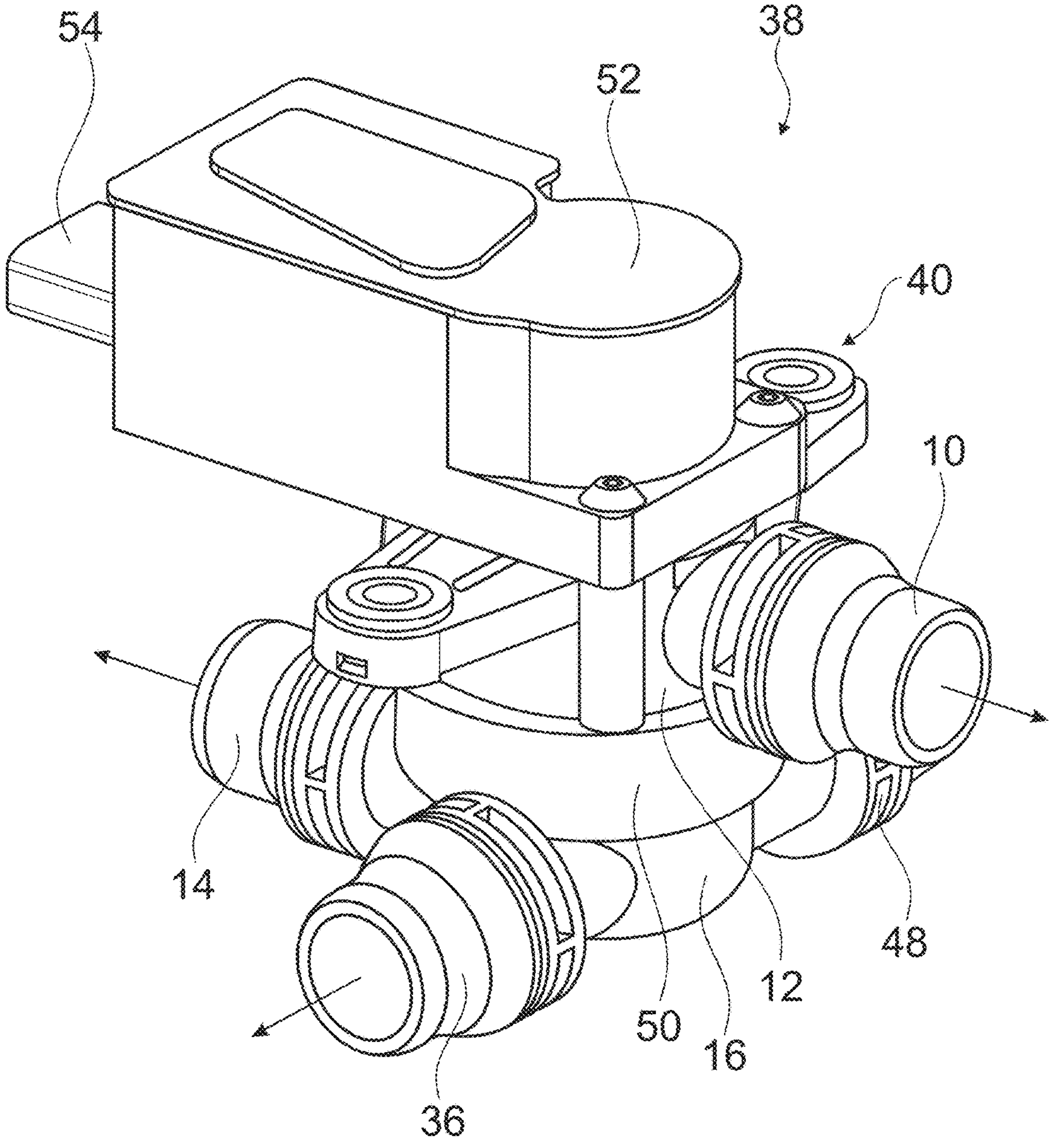

device comprises at least one elastically deformable sealing element, which is arranged in the disc pack receiving space in an elastically pre-loaded fashion, such that in a mounted state of the valve parts the disc pack is pressed towards an abutment.

10 Claims, 5 Drawing Sheets

(56) References Cited

U.S. PATENT DOCUMENTS

| | | | | |
|---|---|---|---|---|
| 4,966,186 | A | 10/1990 | Rodstein | |
| 6,575,196 | B1 * | 6/2003 | Creswell | F16K 3/10 137/454.6 |
| 10,378,664 | B2 | 8/2019 | Choi | |
| 2001/0029984 | A1 | 10/2001 | Creswell et al. | |
| 2007/0199599 | A1 | 8/2007 | Creswell et al. | |
| 2021/0080123 | A1 | 3/2021 | Metker et al. | |

FOREIGN PATENT DOCUMENTS

| | | | |
|---|---|---|---|
| GB | 2160683 | A | 12/1985 |
| KR | 20090117512 | A | 11/2009 |

OTHER PUBLICATIONS

Search Report received in related International Application No. PCT/EP2022/087322, mailed Apr. 13, 2023, 2 pages.

International Preliminary Report on Patentability received in related International Application No. PCT/EP2022/087322, mailed Jun. 20, 2024, 10 pages.

* cited by examiner

DISC VALVE DEVICE, DISC VALVE AND METHOD FOR PRODUCING A DISC VALVE DEVICE

CROSS-REFERENCE TO RELATED APPLICATIONS

This patent application is a U.S. national stage application of international patent application PCT/EP2022/087322, filed on Dec. 21, 2022, which is based on and claims priority to German patent application DE 10 2022 100 831.2, filed on Jan. 14, 2022, the contents of which are incorporated herein by reference.

PRIOR ART

The invention concerns a disc valve device, a disc valve and a method.

Disc valves in which a disc pack is held in position via a spring support have already been proposed. An increased resistance to counter-flow is achievable only with difficulty with such disc valves.

The objective of the invention is in particular to provide a generic device having advantageous properties with regard to tightness, in particular also in the event of counter-flows occurring. The objective is achieved according to the invention.

ADVANTAGES OF THE INVENTION

The invention is based on a disc valve device with at least one first valve part comprising at least one first fluid port, with at least one second valve part comprising at least one second fluid port which is manufactured separately from the first valve part, and with at least one disc pack comprising at least one first valve disc and at least one second valve disc that is rotatable relative to the first valve disc, wherein flow-through paths can be opened and/or closed depending on a position of the valve discs of the disc pack relative to one another, and wherein, in particular in a ready-to-operate state of a disc valve including the disc valve device, the first valve part and the second valve part are mounted to each other in such a way that the valve parts together form a disc pack receiving space within which at least the disc pack is accommodated.

It is proposed that the disc valve device comprises at least one elastically deformable sealing element, which is arranged in the disc pack receiving space in an elastically pre-loaded fashion, such that in a mounted state of the valve parts the disc pack gets/is pressed towards/against an abutment, which is in particular situated opposite the sealing element and in particular forms a portion of the first valve part. This advantageously allows achieving a high degree of tightness, in particular also if there are counter-flows (>1 bar). Advantageously, the high degree of tightness can be achieved independently of spring elements, whereby costs can be kept advantageously low. Advantageously, a number of components can be kept small. Advantageously, low component complexity is achievable for a disc valve. A "disc valve device" is in particular to mean an, in particular operational, component, in particular a structural and/or functional component, of a disc valve. By a "disc valve" is in particular a valve to be understood that is configured for controlling and/or directing a fluid flow by a rotation of at least two discs against one another, which are situated one on top of the other one and each have at least one opening. In particular, a valve path of the disc valve is open if there is an overlap of the openings of the two discs, and closed if there is no overlap. "Configured" is in particular to mean specifically programmed, designed and/or equipped. By an object being configured for a specific function is in particular to be understood that the object fulfils and/or carries out this specific function in at least one application state and/or operation state.

In particular, the first valve part forms a lower valve part of the disc valve. Preferably the first valve part forms at least a receiving space for a drive shaft. Preferably the first valve part forms at least a receiving space for a drive motor and/or for a drive transmission. Alternatively, the first valve part has at least one connection for a motor housing and/or for a transmission housing. In particular, the first fluid port of the first valve part implements a fluid inlet of the disc valve device. In particular, the first valve part, in particular also in the case of an implementation of the disc valve as a 3/X valve or as a 4/X valve, has exactly one fluid port, namely the first fluid port. In particular, the first fluid port is configured for a feeding of the fluid to the disc valve device. In particular, a designated flow direction of the disc valve device is directed from the first valve part towards the second valve part. In particular, a designated counter flow direction of the disc valve device is directed from the second valve part towards the first valve part. In particular, the first valve part and the second valve part together form a valve housing of the disc valve device.

In particular, the second valve part forms an upper valve part of the disc valve. The valve parts being "manufactured separately" is in particular to mean that the valve parts are realized free of common components. In particular, the valve parts are formed as separate plastic injection-molded parts. In particular, the two valve parts are configured to be connected/coupled to each other for the formation of fluid-tight flow paths through the disc valve. In particular, the valve parts in each case have connection zones configured for a coupling with the respective other valve part, e. g. by mutual engagement. In particular, the second fluid port of the second valve part forms a first fluid outlet of the disc valve device. In particular, the second valve part, in particular if the disc valve is realized as a 3/X valve or as a 4/X valve, has at least one further fluid port, namely the further second fluid port. In particular, the second fluid port and/or the further second fluid port are/is configured for conveying the fluid away from the disc valve device. In particular, the second fluid port and the further second fluid port are oriented and/or open in mutually different directions.

The first valve disc and/or the second valve disc are in particular formed as flat discs, preferably at least substantially round discs, which are realized separately from one another. The first valve disc and/or the second valve disc in particular each have at least one opening that penetrates the respective valve disc in the axial direction/in a direction perpendicular to a disc plane of the respective disc. The first valve disc preferably has at least one further opening, which is preferably shaped at least substantially identical to the opening. The openings of the valve discs are preferably in each case circumferentially enclosed by the respective disc in the disc plane. The openings of the valve discs in particular have an annulus segment shape, but may also have almost any different shape. The openings of the valve discs are preferably congruent. In particular, the second valve disc is configured to selectively superimpose its opening on one of the openings of the first valve disc by rotation relative to the first valve disc, and in this way to select, in particular selectively, one of several flow paths through the disc valve. In particular, in the valve housing which is formed by the first valve part and the second valve part, the disc pack is arranged in such a way that the first valve disc faces towards the second valve part. In particular, in the valve housing which is formed by the first valve part and the second valve part, the disc pack is arranged in such a way that the second valve disc faces towards the first valve part.

In particular, the first valve disc has a somewhat larger circumference and/or diameter than the second valve disc. Alternatively, however, it is also possible that the second valve disc has a somewhat larger circumference and/or diameter than the first valve disc. The disc pack receiving space is preferably formed at a connection point of the valve parts to each other. In particular, the first valve part at least partially delimits the disc pack receiving space. In particular, the second valve part at least partially delimits the disc pack receiving space. By the sealing element being "elastically deformable" is in particular also to be understood that after a deformation the sealing element seeks an automatic return to its initial state, preferably to its initial shape. By the sealing element being arranged in the disc pack receiving space in an "elastically pre-loaded" manner is in particular to be understood that the sealing element is arranged in the disc pack receiving space in such a way that it is prevented from assuming its initial state. In particular, the sealing element is arranged in the disc pack receiving space in an elastically deformed, preferably compressed state. Preferably the force generated by the sealing element seeking to return to the initial state presses the disc pack in a direction that points away from the sealing element, preferably in an axial direction of the valve disc(s), such that in particular the disc pack is pressed against the abutment. The abutment being "situated opposite the sealing element" is in particular to mean that the sealing element and the abutment, in particular at least in the ready-to-operate state of the disc valve comprising the disc valve device, are arranged on sides of the disc pack which point (directly) away from each other/are oriented in mutually (directly) opposed directions. In particular, in the mounted state the sealing element presses the disc pack against the abutment permanently.

In particular, during operation pressures are present on both sides of the disc pack, wherein an input pressure from the first fluid port is present at the second valve disc, and wherein a counter-pressure from one or several of the second fluid ports is present at the first valve disc. In particular, from a specific minimal pressure difference (e. g. less than 3.5 bar pressure difference between the two sides of the disc pack) and/or from a specific maximal counter-pressure (e. g. more than 1.5 bar counter-pressure at the first valve disc), the second valve disc abuts on the abutment. Preferably, in normal operation, in which a pressure present on the side of the first valve disc is below a limit pressure (e. g. of 1.5 bar), the disc pack does not touch the abutment. In particular, an input pressure from the first fluid port/a pressure difference between the input pressure from the first fluid port and the counter-pressure of the second fluid ports will determine a compression state of the sealing element. The higher the input pressure/the pressure difference between input pressure and counter-pressure, the higher is preferably the compression of the sealing element. If the disc pack abuts on the abutment, the sealing element in particular has a minimally possible compression/a maximally possible expansion in the disc pack receiving space. In particular, the disc pack is free of contact with the abutment in a state in which there is an input pressure (e. g. of 5 bar) from the first fluid port and no counter-pressure/a counter-pressure from the second fluid ports that is below a limit pressure (of e. g. 1.5 bar) at the disc pack. In particular, in a completely pressure-free/pressure-difference-free state of the disc valve device, the disc pack is pressed against the abutment in a contacting fashion by the sealing element.

Advantageously, the disc valve device/the disc valve is realized free of springs. Advantageously, the disc valve device/the disc valve is free of compression springs which are braced on the disc pack and/or which press the disc pack through the disc valve counter to a counter-flow direction. This advantageously enables a simple and/or cost-effective construction.

If the sealing element is arranged on a side of the disc pack that faces away from a designated standard flow-through direction through the disc pack, a high degree of tightness is advantageously achievable, in particular also if there are counter-flows (>1 bar). In particular, the pressure present at the first fluid port holds the disc pack in a state free of contact with the abutment. In particular, the counter-pressure present at the second fluid ports presses the disc pack, against the pressure from the first fluid port, towards the abutment.

It is further proposed that, in particular in all regular operation states of the disc valve comprising the disc valve device, the sealing element bears sealingly against the first valve disc, which is arranged in the disc pack receiving space in such a way that it is at least fixed in regard to rotational position relative to the valve parts. This advantageously allows achieving a high degree of tightness, in particular also if there are counter-flows (>1 bar). In particular, the first valve disc is arranged in the disc pack receiving space in such a way that a rotation of the first valve disc, in particular around an axial direction of the first valve disc, is impossible, but a (slight) vertical movement of the first valve disc (together with the second valve disc)/of the disc pack along the axial direction of the first valve disc and/or of the second valve disc/along a rotary axis of the second valve disc is enabled, preferably depending on the pressures present at the disc pack.

If moreover the sealing element is elastically pre-loaded in such a way that it bears sealingly against the first valve disc at least up to a counter-pressure of 1.5 bar acting on the first valve disc, a high degree of tightness is advantageously achievable, in particular even if there are strong counter-flows. In particular, the sealing element is elastically pre-loaded in such a way that it bears sealingly against the first valve disc, at least even if the disc pack abuts on the abutment. "Bearing sealingly against" is in particular to mean bearing against at least in a fluid-tight manner.

It is further proposed that the abutment is embodied as a metal disc or as a ceramic disc, wherein in particular at least the second valve disc pressed against the abutment is made of a ceramic, of a plastic or of a metal. This advantageously allows achieving an especially long service life of the disc valve device, in particular by keeping wear of the abutment and/or of the second valve disc low. In particular the first valve part forms an abutment element configured to accommodate the abutment. The abutment is preferably fastened to the abutment element, for example glued onto the abutment element. The abutment element is realized integrally with the first valve part. "Integrally" is in particular to mean connected by substance-to-substance bond, like for example by a welding process and/or gluing process etc., and advantageously molded-on in a one-part implementation, such as by production from a cast and/or by production in a single-component or multi-component injection-molding process.

Moreover, it is proposed that the second valve disc is connected to the drive shaft. This advantageously enables providing simple, reliable and/or comfortable switchability for the disc valve. In particular, the drive shaft is configured for a transmission of a rotational movement of a drive motor and/or drive transmission to the second valve disc. As a result of the movement of the drive shaft, preferably the openings are brought into overlap/removed from the overlap.

Beyond this, it is proposed that the sealing element is realized as a shaped packing. This advantageously allows achieving a high degree of tightness. In particular, the sealing element is made of an elastically deformable plastic, in particular an elastomer, for example a caoutchouc, a synthetic caoutchouc, a Teflon (PTFE) or another elastically deformable plastic with a sealing effect. By a "shaped packing" is in particular a sealing to be understood which varies, in particular increases, its sealing effect automatically depending on operating pressures. In particular, the shaped packing permits a small translational movement of the disc pack without loss of its sealing effect. In particular, a sealing surface generated by a shaped packing is load-dependent. In particular, the sealing surface of the shaped packing of the disc valve device is the greater, the greater a pressure difference is between the first fluid port and the second fluid ports. Preferably, in particular as a result of the implementation/dimensioning of the disc pack receiving space and/or of a sealing element receiving space for the sealing element, in particular the shaped packing, which in particular adjoins the disc pack receiving space, the sealing surface is sufficiently large to generate a sufficient sealing effect, even in the case of a minimal pressure difference, preferably also in the case of an applied counter-pressure of up to 1.5 bar.

If herein moreover the shaped packing is realized integrally, preferably in a one-part/monolithic implementation, it is advantageously possible to ensure a high degree of tightness.

It is furthermore proposed that the shaped packing bears against the second valve part and/or, in addition to a sealing of the second fluid port of the second valve part, seals at least one further second fluid port of the second valve part. This in particular allows achieving an advantageous construction of the disc valve device, preferably of the disc valve. In particular, the second valve part forms at least one crimp, which is in particular circumferential around an opening of at least one of the second fluid ports/circumferential around all openings of the second fluid ports, and which is configured for receiving the shaped packing. In particular, in a non-compressed/non-loaded state the shaped packing has a height which is substantially greater, in particular by at least 30% greater, preferably by at least 20% greater and preferentially by at least 10% greater, than a depth of the crimp.

In particular, in the non-compressed/non-loaded state the shaped packing protrudes from the crimp (in a direction perpendicular to an opening plane of the openings of the second fluid ports). In particular, the shaped packing assumes the non-loaded state only before a mounting of the two valve parts relative to each other.

Furthermore, a disc valve comprising the disc valve device and a method for producing the disc valve device are proposed, wherein the elastically deformable sealing element is elastically pre-loaded in the disc pack receiving space in such a way that in the mounted state of the valve parts the disc pack gets/is pressed towards/against the abutment, which is in particular situated opposite the sealing element and in particular is at least connected to the first valve part. This advantageously allows achieving a high degree of tightness, in particular also if there are counter-flows (>1 bar). Advantageously, the high degree of tightness is achievable independently of spring elements, such that costs can advantageously be kept low.

In addition, it is proposed that the sealing element is elastically pre-loaded by pressing one of the valve parts against the respective other valve part or by pressing the valve parts against each other, in particular while the valve parts are being mounted to each other in order to form the disc valve. This advantageously allows achieving a high degree of tightness. In particular, during mounting the first valve part and the second valve part are moved towards each other, such that the sealing element protruding from the crimp of the second valve part is compressed and is thus elastically pre-loaded.

If herein a relative position of the valve parts with respect to each other, and thus a pre-load of the sealing element, is adjusted by servo-pressing, this allows achieving high accuracy of the relative positions of the valve parts in the mounted state, such that a sealing effect of the sealing element can advantageously be adjusted precisely. Advantageously, it is on the one hand possible to avoid an insufficient pre-load and thus insufficient tightness of the sealing element, while it is on the other hand advantageously possible to avoid an excessive pre-load and thus an excessive load on the sealing element (partial plastic deformation/unfavorable settling behavior), thus avoiding a restriction of the service life of the sealing element. Using the servo-pressing method it is advantageously possible to eliminate tolerances. A "servo-pressing" is in particular to mean a compression method/pressing method that is carried out using a servo-press for pressing together the first valve part and the second valve part. In particular, servo-presses are mechanical presses in which a force transmission takes place without mechanical couplings. In particular, a mechanical coupling in the servo-press is replaced by a force transmission of a servo drive (electric motor with control). In particular, servo-presses are presses operated by a servo motor. As a result, servo-presses advantageously achieve high accuracy, in particular with regard to the pressing path and/or a pressing force. In particular, servo-pressing actually permits the use of shaped packings because they have a relatively small tolerance range (compression tolerance range) in which good functionality can be guaranteed.

In addition, it is proposed that in at least one pre-mounting step, the sealing element is introduced into the second valve part, in particular into the crimp of the second valve part, and the disc pack is introduced into the first valve part, and that a defined pre-load of the sealing element is set in that in at least one first pre-load setting step, the, in particular pre-mounted, first valve part and the, in particular pre-mounted, second valve part are brought into abutment ("on block" of the servo-press) with each other, preferably by an actuation of the servo-press, and in at least one second pre-load setting step, the valve parts situated in abutment are then traversed apart again by a defined path, in particular via an actuation of the servo-press. This advantageously enables achieving an exact, reliable and/or reproducible pre-load of the sealing element, in particular in an especially simple manner. Moreover, this advantageously allows adjusting a remaining gap for possible thermal expansion.

It is furthermore proposed that, following the setting of the pre-load of the sealing element, the valve parts which were arranged precisely relative to each other in the pre-load setting steps are joined in a joining step, for example laser-welded with each other, glued to each other or connected to each other using a further joining method. This advantageously enables simple, reliable and stable fixing of the position of the two valve parts relative to each other. As a result, it is advantageously possible to permanently maintain the pre-load that was adjusted precisely during the servo-pressing. In particular, in order to enable laser welding, at least the valve part which overlaps the other valve part toward the outside is realized in laser-transparent fashion.

The disc valve device according to the invention, the disc valve according to the invention and/or the method according to the invention shall here not be limited to the above-described application and implementation. In particular, in order to fulfil a functionality that is described here, the disc valve device according to the invention, the disc valve according to the invention and/or the method according to the invention may have a number of individual elements, components and units that differs from a number given here.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features individually and will find further expedient combinations.

Figure 2B:
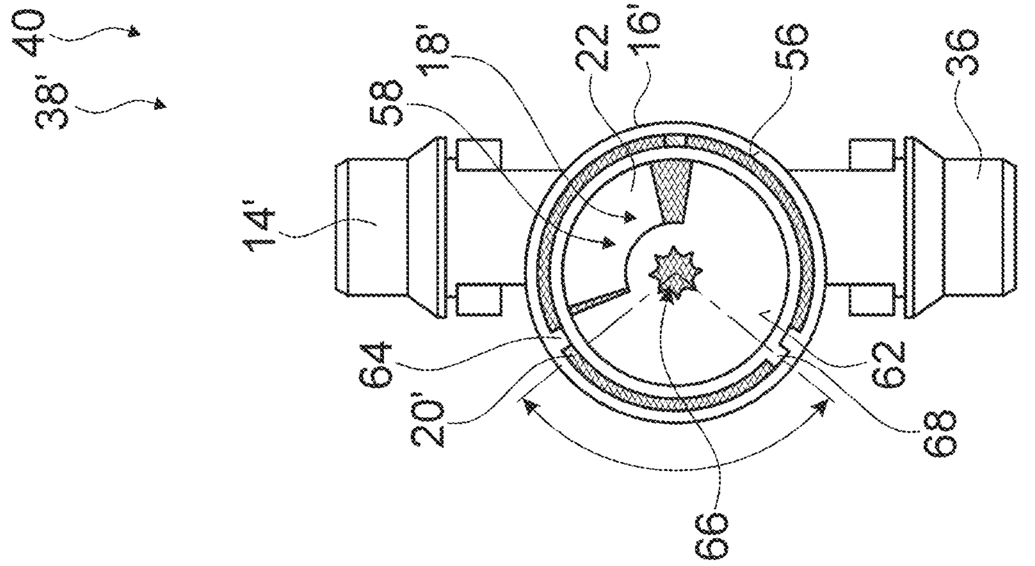
Figure 2A:
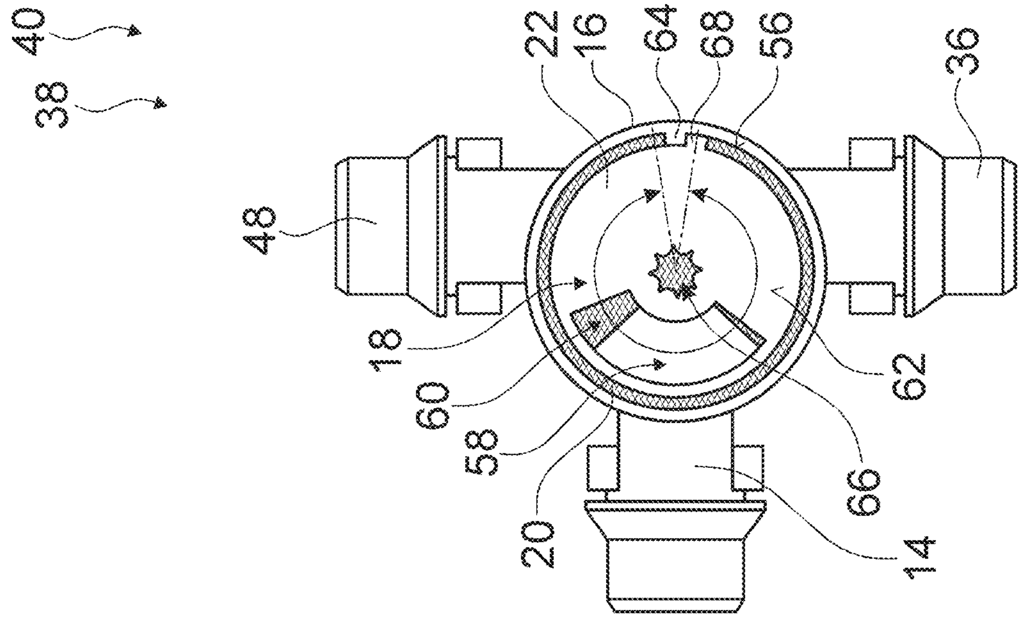
Figure 3:
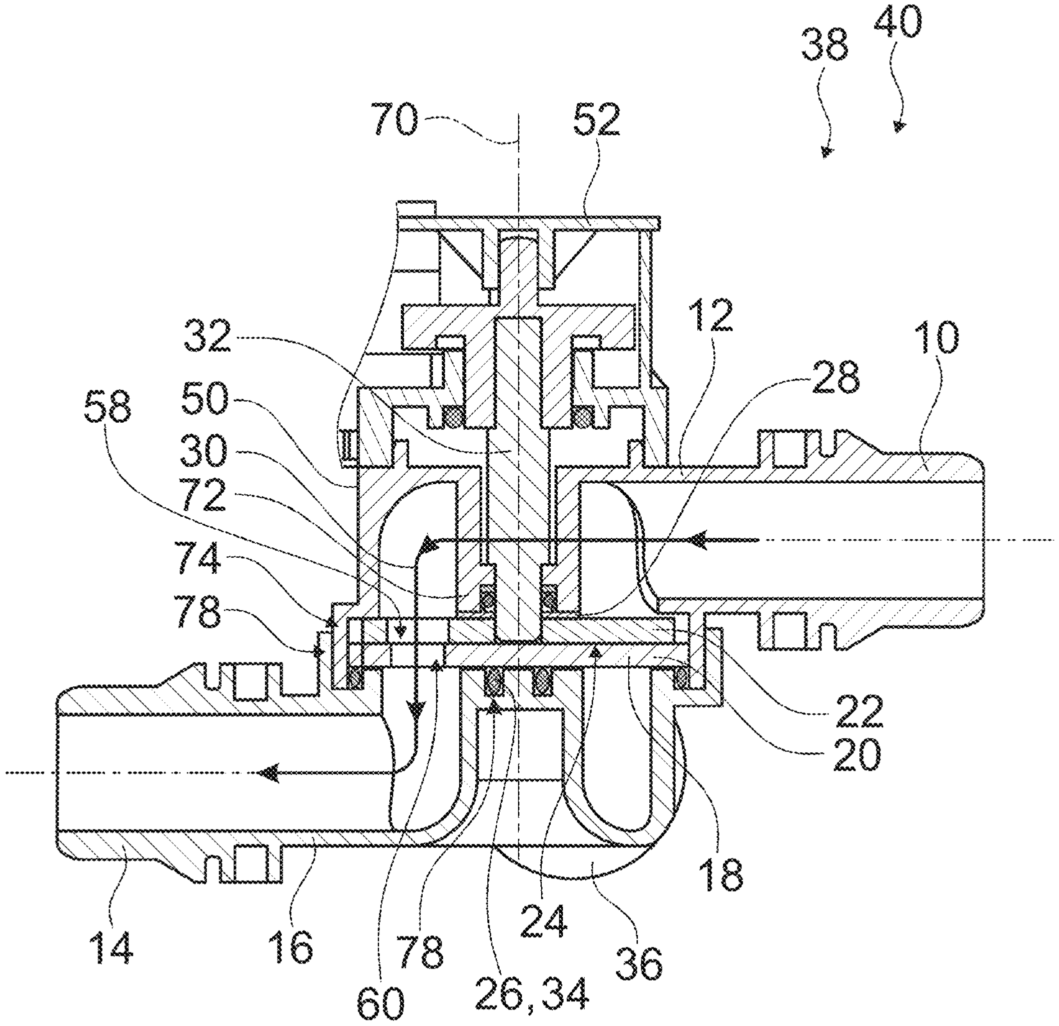
Figure 4:
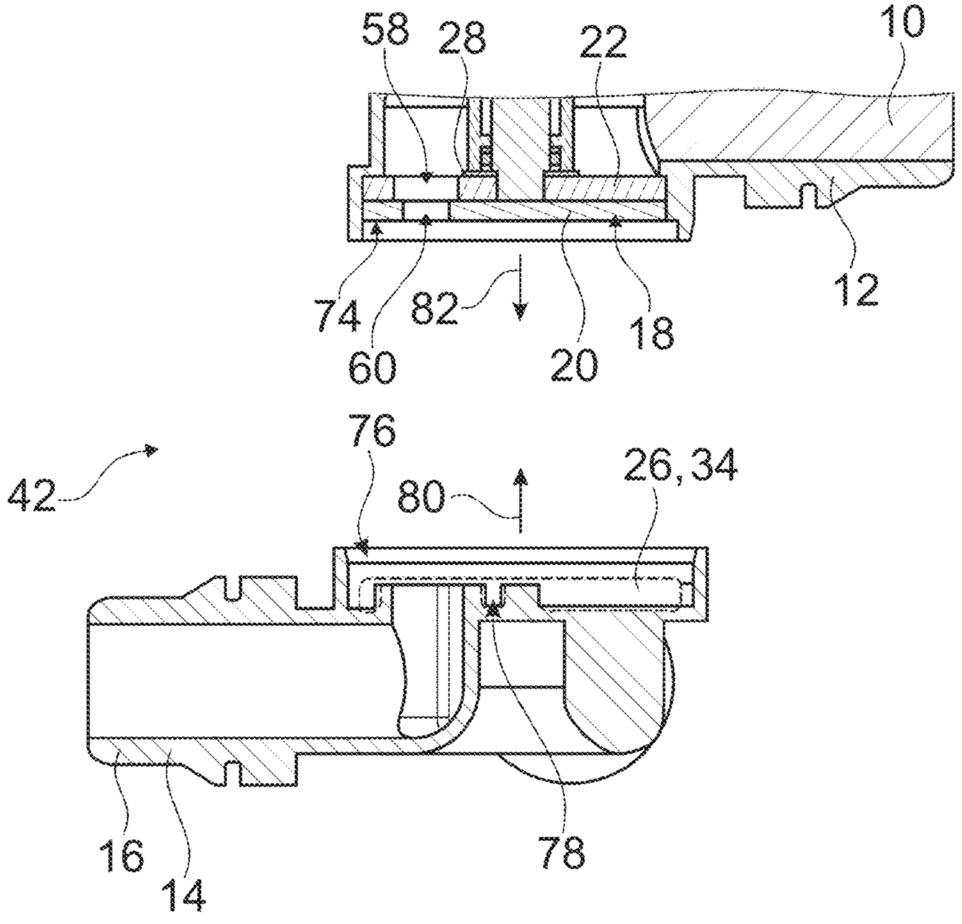
Figure 5:
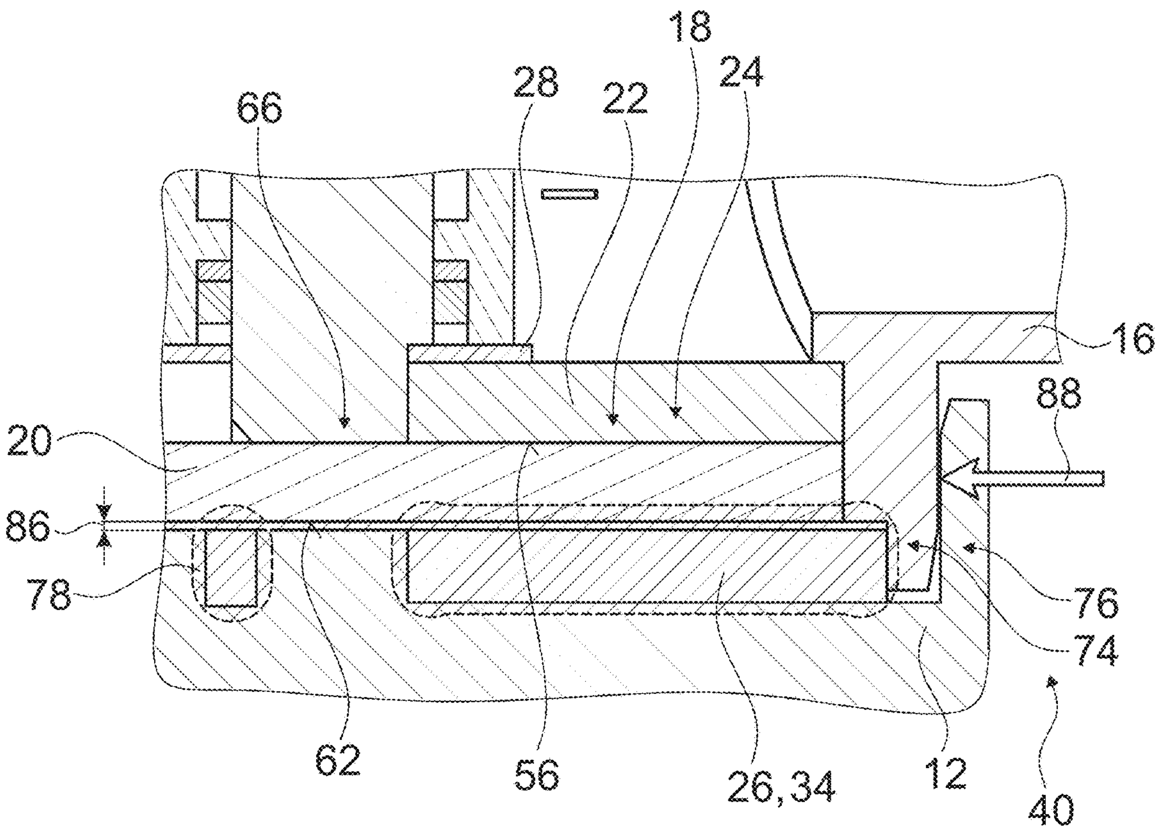
Figure 6:
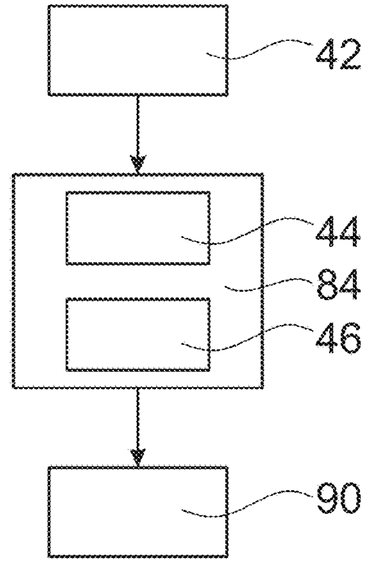

In the drawings:

FIG. 1 shows a schematic perspective view of a disc valve,

FIG. 2*a* shows a schematic plan view of the disc valve with the valve housing open, FIG. 2*b* shows a schematic top view of an alternative disc valve with the valve housing open, FIG. 3 shows a schematic sectional side view of a disc valve device of the disc valve in a first sectional plane, FIG. 4 shows a further schematic sectional side view of the disc valve device in a non-mounted state in a further sectional plane different from the sectional plane, FIG. 5 shows a detail of the further schematic sectional side view in the further sectional plane of the disc valve device in a mounted state, and FIG. 6 shows a schematic flow chart of a method for producing the disc valve device.

DESCRIPTION OF THE EXEMPLARY EMBODIMENT

FIG. 1 shows a schematic perspective view of a disc valve 38. The disc valve 38 is illustrated by way of example as a 4/X valve. The disc valve 38 comprises a disc valve device 40. The disc valve device 40 comprises a first valve part 12. The disc valve device 40 comprises a second valve part 16. The valve parts 12, 16 are manufactured as separate components. The first valve part 12 comprises a first fluid port 10. The first fluid port 10 forms a fluid inlet of the disc valve 38. The second valve part 16 comprises a second fluid port 14. The second fluid port 14 forms a fluid outlet of the disc valve 38. The second valve part 16 comprises a further second fluid port 36. The further second fluid port 36 forms a further alternative fluid outlet of the disc valve 38. The second valve part 16 comprises an additional further second fluid port 48. The additional further second fluid port 48 forms an additional further alternative fluid outlet of the disc valve 38. The fluid outlets of the second valve part 16 are open in different directions. The fluid outlets of the second valve part 16 are open in directions which are perpendicular or opposed to one another. Alternative orientations of the fluid inlets and fluid outlets of the disc valve 38 are of course conceivable. The disc valve 38 comprises a valve housing 50. The valve parts 12, 16 at least partially form the valve housing 50. The valve housing 50 comprises a motor and/or transmission housing part 52. The motor and/or transmission housing part 52 is connected to the first valve part 12. The motor and/or transmission housing part 52 forms a receiving space for a drive motor (not shown) of the disc valve 38 and/or for a drive transmission (not shown) of the disc valve 38. The motor and/or transmission housing part 52 forms a connection plug 54.

FIGS. 2*a* and 2*b* respectively show a top view of the second valve part 16 that is separate from the remaining portion of the valve housing 50, wherein in FIG. 2*a* the second valve part 16 of the disc valve 38 formed as a 4/X valve is shown, and wherein in FIG. 2*b* an alternative second valve part 16' of an alternative disc valve 38' formed as a 3/X valve is shown. The second valve part 16 and the alternative second valve part 16' are each combinable with the same first valve part 12.

The disc valve device 40 comprises a disc pack 18, 18'. The disc pack 18, 18' comprises a first valve disc 20, 20'. The first valve disc 20, 20' is mounted in a rotationally fixed fashion in the disc valve device 40, in particular in the second valve part 16, 16'. The first valve disc 20, 20' is arranged in the disc pack receiving space 24 in such a way that it is fixed in regard to rotational position relative to the valve parts 12, 16, 16'. The first valve disc 20, 20' has openings 58 which penetrate the first valve disc 20, 20' in a direction perpendicular to a disc plane 56 of the first valve disc 20, 20'. If the disc valve 38 is realized as a 4/X valve (FIG. 2*a*), the first valve disc 20 has three openings 58. If the disc valve 38' is realized as a 3/X valve (FIG. 2*b*), the first valve disc 20' has two openings 58. In FIGS. 2*a* and 2*b* in each case only one of the openings 58 of the first valve disc 20, 20' is visible, while the further openings 58 of the first valve disc 20, 20' are in each case covered by a second valve disc 22. The disc pack 18, 18' comprises the second valve disc 22. The second valve disc 22 is realized so as to be rotatable at least relative to the first valve disc 20, 20'. The first valve disc 20, 20' and the second valve disc 22 are mounted directly on each other. The first valve disc 20, 20' and the second valve disc 22 are in contact with each other. The first valve disc 20, 20' and the second valve disc 22 have overlapping axial directions 70, wherein the axial directions 70 in each case run through a center of the valve discs 20, 20', 22 which are realized at least substantially as round discs (cf. also FIG. 3). The second valve disc 22 has exactly one opening 60 which penetrates the second valve disc 22 in a direction perpendicular to a disc plane 62 of the second valve disc 22. By rotation of the second valve disc 22, the opening 60 of the second valve disc 22 can be brought into overlap with one of the openings 58 of the first valve disc 20, 20'. In this way, flow paths through the disc pack 18, 18' are selectively opened or closed. Depending on a position of the valve discs 20, 20', 22 of the disc pack 18, 18' relative to one another, the flow paths through the disc pack 18, 18' can be opened and/or closed in a fluid-tight manner. The second valve disc 22 comprises a rotation abutment element 68, which interacts with a rotation abutment element 64 of the first valve part 12 in order to limit the rotation angle of the second valve disc 22. The rotation abutment element 68 of the second valve disc 22 is realized as an extension of the second valve disc 22, which projects outwards in the radial direction. The rotation abutment element 64 of the first valve part 12 is realized as a projection of the first valve part 12, which projects inwards in the radial direction. The second valve disc 22 comprises a shaft receptacle 66. The shaft receptacle 66 is configured for a mounting of a drive shaft 32 (cf. FIG. 3). The valve discs 20, 20', 22 are realized as ceramic discs. Alternatively, however, other materials are also conceivable (e.g. plastic or metal).

FIG. 3 shows a schematic sectional side view of the disc valve device 40 in a first sectional plane. The first valve part 12 comprises a connection zone 74. The second valve part 16 comprises a connection zone 76. In the mounted state of the disc valve 38, the valve parts 12, 16 are fixedly connected to each other via the connection zones 74, 76. The first valve part 12 and the second valve part 16 are mounted to each other in such a way that the valve parts 12, 16 together form a disc pack receiving space 24. The disc pack receiving space 24 is at least partially formed by the connection zones 74, 76 of the valve parts 12, 16. The disc pack 18 is accommodated in the disc pack receiving space 24. In the disc pack receiving space 24, the disc pack 18 is minimally movable along the axial direction 70. The disc valve device 40 comprises an abutment 28. The abutment 28 delimits the disc pack receiving space 24 at least to one side, preferably to a side of the first valve part 12. The abutment 28 is embodied as a metal disc. Alternatively, the abutment 28 may be embodied as a ceramic disc. The abutment 28 forms an abutment surface for the second valve disc 22. The first valve part 12 forms an abutment element 72 configured to support/hold the abutment 28. Preferably the abutment 28 is glued onto the abutment element 72 of the first valve part 12. The disc valve 38, in particular the disc valve device 40, comprises the drive shaft 32. The second valve disc 22 is connected to the drive shaft 32. A standard flow-through direction 30 through the disc valve 38, in particular through the disc pack 18, is indicated by an arrow in FIG. 3.

The disc valve device 40 comprises a sealing element 26 (cf. also FIGS. 4 and 5). The second valve part 16 forms a sealing element receptacle 78. The sealing element receptacle 78 is realized as a crimp/as several crimps. The sealing element receptacle 78 is configured to accommodate the sealing element 26. In the mounted state of the disc valve 38, the sealing element 26 is arranged in the sealing element receptacle 78. The disc pack receiving space 24 comprises the sealing element receptacle 78. The sealing element 26 is realized in an elastically deformable fashion. The sealing element 26 is realized as a shaped packing 34. The sealing element 26, in particular the shaped packing 34, is realized in a one-part implementation. In particular in the mounted state of the disc valve 38, the sealing element 26/the shaped packing 34 is arranged in the disc pack receiving space 24 in an elastically pre-loaded state. In particular in the mounted state of the disc valve 38, the sealing element 26/the shaped packing 34 is arranged in the sealing element receptacle 78 in an elastically pre-loaded state. The sealing element 26 is arranged on a side of the disc pack 18 that is situated opposite the abutment 28. The sealing element 26 and the abutment 28 are arranged on different sides of the disc pack 18, in particular of the disc pack receiving space 24. The sealing element 26 is arranged on a side of the disc pack 18 that faces away from the designated standard flow-through direction 30 through the disc pack 18. The sealing element 26 is arranged in an elastically pre-loaded fashion, such that in the mounted state of the valve parts 12, 16 the disc pack 18 is pressed towards the abutment 28. The sealing element 26/the shaped packing 34 bears sealingly against the second valve part 16. The sealing element 26/the shaped packing 34 bears sealingly against the first valve disc 20. The sealing element 26 is, in particular in a pressure-free state on an input side of the disc valve 38, elastically pre-loaded in such a way that it bears sealingly against the first valve disc 20 at least up to a counter-pressure of 1.5 bar acting on the first valve disc 20. The (one-part) sealing element 26/the shaped packing 34, in addition to the sealing of the second fluid port 14 of the second valve part 16, seals at least the further second fluid port 36 of the second valve part 16, preferably all further second fluid ports 36, 48 of the second valve part 16.

FIG. 4 schematically shows a further sectional side view of the disc valve device 40 in a further sectional plane different from the sectional plane, wherein the two valve parts 12, 16 have not yet been mounted to each other. During mounting, the valve parts 12, 16 are moved towards each other along the indicated arrows 80, 82 and the connection zones 74, 76 are connected to each other, such that the disc pack receiving space 24 is formed. FIG. 5 also shows the further sectional side view in the further sectional plane, after the two valve parts 12, 16 have been mounted to each other, in a detail. The sealing element 26, in particular the shaped packing 34, is illustrated here as well as in FIG. 4 as it would appear in a non-compressed, i.e. non-pre-loaded, state (therefore the overlap of sealing element 26 and valve part 12, respectively valve disc 20 in the drawings). The arrow 88 indicates the direction of incidence of a laser beam which can be used for a welding of the two valve parts 12, 16 to each other. In this case, in a connection zone of the two valve parts 12, 16, the outer second valve part 16 is realized in laser-transparent fashion.

FIG. 6 shows a schematic flow chart of a method for producing the disc valve device 40, in particular the disc valve 38 with the disc valve device 40. In at least one pre-mounting step 42, the sealing element 26 is introduced into the second valve part 16, 16'. In the pre-mounting step 42, the disc pack 18, 18' is introduced into the first valve part 12. In the pre-mounting step 42, the second valve disc 22 is connected to the drive shaft 32. In the pre-mounting step 42, the first valve disc 20, 20' is fastened in the first valve part 12 in a rotationally position-fixed manner. In the pre-mounting step 42, the valve parts 12, 16 are still separate from each other. In a further method step 84, the valve parts 12, 16 are moved towards each other, in particular along a direction that runs parallel to an axial direction 70 of one of the valve discs 20, 20', 22. In the method step 84, a final distance between the two valve parts 12, 16 is defined precisely. In the method step 84, a dimension of the disc pack receiving space 24 is adjusted precisely. In the method step 84, the pre-load of the sealing element 26/the shaped packing 34 is adjusted precisely. In the method step 84, the elastic pre-load of the sealing element 26 is achieved by pressing one of the valve parts 12, 16, 16' against the respective other valve part 12, 16, 16' or by pressing the valve parts 12, 16, 16' against each other. In the method step 84, in a first pre-load setting step 44 which in particular constitutes a sub-step of the method step 84, the defined pre-load of the sealing element 26/the shaped packing 34 is adjusted in that the pre-mounted first valve part 12 and the pre-mounted second valve part 16, 16' are brought into abutment with each other/are moved on block, and then in a second pre-load setting step 46 which in particular also constitutes a sub-step of the method step 84, the valve parts 12, 16, 16' situated in abutment are traversed apart once more by a defined path. In the method step 84, the relative position of the valve parts 12, 16, 16' with respect to each other, and thus the pre-load of the sealing element 26, is adjusted by servo-pressing the valve parts 12, 16 onto each other/against each other. In the method step 84, an (in the pressure-unloaded state) precisely defined gap 86 (cf. also FIG. 5) between the second valve part 16 and the first valve disc 20 is set via the pre-load setting steps 44, 46. The dimension of the gap 86 is in particular also selected taking into account a thermal expansion of the components of the disc valve 38. Via the pre-load setting steps 44, 46 of the method step 84, the elastically deformable sealing element 26 is elastically pre-loaded in the disc pack receiving space 24 in such a way that, in the mounted state of the valve parts 12, 16, 16', the disc pack 18, 18' is pressed towards the abutment 28, which is situated opposite the sealing element 26 and is at least connected to the first valve part 12. The precise adjustment of the dimension of the gap 86 and/or of the elastic pre-load of the sealing element 26 is carried out using a servo-press. Following the adjustment of the pre-load of the sealing element 26/the shaped packing 34, in a joining step 90, the valve parts 12, 16, 16', which were arranged precisely relative to each other in the pre-load setting steps 44, 46, are joined to each other, for example by a laser welding or by another suitable joining technique.

The invention claimed is:

1. A disc valve device with at least one first valve part comprising at least one first fluid port, with at least one second valve part comprising at least one second fluid port which is manufactured separately from the first valve part, and with at least one disc pack comprising at least one first valve disc and at least one second valve disc that is rotatable relative to the first valve disc, wherein flow-through paths can be opened and/or closed depending on a position of the valve discs of the disc pack relative to one another, and wherein the first valve part and the second valve part are mounted to each other in such a way that the valve parts together form a disc pack receiving space within which at least the disc pack is accommodated, the disk valve device further comprising at least one elastically deformable sealing element, which is arranged in the disc pack receiving space in an elastically pre-loaded fashion, such that in a mounted state of the valve parts the disc pack is pressed towards an abutment, which is situated opposite the sealing element, which is at least connected to the first valve part and which is separate from a drive shaft that is configured for a transmission of a rotational movement of a drive motor and/or drive transmission to the second valve disc.

2. The disc valve device according to claim 1, wherein the sealing element is arranged on a side of the disc pack that faces away from a designated standard flow-through direction through the disc pack.

3. The disc valve device according to claim 1, wherein the sealing element bears sealingly against the first valve disc, which is arranged in the disc pack receiving space in such a way that the first valve disc is at least fixed in regard to rotational position relative to the valve parts.

4. The disc valve device according to claim 1, wherein the sealing element is elastically pre-loaded in such a way that it bears sealingly against the first valve disc at least up to a counter-pressure of 1.5 bar acting on the first valve disc.

5. The disc valve device according to claim 1, wherein the abutment is embodied as a metal disc or as a ceramic disc.

6. The disc valve device according to claim 1, wherein the second valve disc is connected to a drive shaft.

7. The disc valve device according to claim 1, wherein the sealing element is realized as a shaped packing.

8. The disc valve device according to claim 7, wherein the shaped packing is realized integrally.

9. The disc valve device according to claim 8, wherein the shaped packing bears against the second valve part and/or, in addition to a sealing of the second fluid port of the second valve part, seals at least one further second fluid port of the second valve part.

10. A disc valve device with at least one first valve part comprising at least one first fluid port, with at least one second valve part comprising at least one second fluid port which is manufactured separately from the first valve part, and with at least one disc pack comprising at least one first valve disc and at least one second valve disc that is rotatable relative to the first valve disc, wherein flow-through paths can be opened and/or closed depending on a position of the valve discs of the disc pack relative to one another, and wherein the first valve part and the second valve part are mounted to each other in such a way that the valve parts together form a disc pack receiving space within which at least the disc pack is accommodated, the disk valve device further comprising at least one elastically deformable sealing element, which is arranged in the disc pack receiving space in an elastically pre-loaded fashion, such that in a mounted state of the valve parts the disc pack is pressed towards an abutment, wherein the sealing element is realized as a shaped packing that is realized integrally and that in addition to a sealing of the second fluid port of the second valve part, seals at least one further second fluid port of the second valve part.

* * * * *